(12) United States Patent
Davis et al.

(10) Patent No.: US 9,171,447 B2
(45) Date of Patent: Oct. 27, 2015

(54) METHOD, COMPUTER PROGRAM PRODUCT AND SYSTEM FOR ANALYZING AN AUDIBLE ALERT

(71) Applicant: International Business Machines Corporation, Armonk, NY (US)

(72) Inventors: Alvin G. Davis, Durham, NC (US); Christopher J. Hardee, Raleigh, NC (US); William M. Megarity, Raleigh, NC (US); April E. Ruggles, Durham, NC (US); Paul A. Wormsbecher, Apex, NC (US)

(73) Assignee: Lenovo Enterprise Solutions (Sinagapore) Pte. Ltd., Singapore (SG)

( * ) Notice: Subject to any disclaimer, the term of this patent is extended or adjusted under 35 U.S.C. 154(b) by 26 days.

(21) Appl. No.: 14/212,848

(22) Filed: Mar. 14, 2014

(65) Prior Publication Data
US 2015/0262469 A1    Sep. 17, 2015

(51) Int. Cl.
*G08B 23/00* (2006.01)
*G08B 21/18* (2006.01)
*G08B 3/10* (2006.01)

(52) U.S. Cl.
CPC .............. *G08B 21/182* (2013.01); *G08B 3/10* (2013.01)

(58) Field of Classification Search
CPC . G08G 1/0965; G08G 1/0968; G08G 1/0969; G08G 1/161; G08G 1/166; G01S 13/931; G01S 17/936; G08B 21/182; G08B 3/10

USPC ............. 340/540, 933, 935, 901–904, 573.4, 340/691.6, 692, 407.1, 988–990, 994; 381/56; 701/26, 301

See application file for complete search history.

(56) References Cited

U.S. PATENT DOCUMENTS

| | | | |
|---|---|---|---|
| 5,495,242 A * | 2/1996 | Kick et al. .................... | 340/902 |
| 8,138,946 B2 * | 3/2012 | Villalobos et al. ............ | 340/902 |
| 8,183,997 B1 | 5/2012 | Wong et al. | |
| 2003/0162523 A1 | 8/2003 | Kapolka et al. | |
| 2005/0074131 A1 * | 4/2005 | Mc Call et al. ................. | 381/86 |
| 2010/0033313 A1 * | 2/2010 | Keady et al. ................... | 340/438 |
| 2013/0070928 A1 * | 3/2013 | Ellis et al. ....................... | 381/56 |
| 2013/0094682 A1 | 4/2013 | Lee et al. | |

FOREIGN PATENT DOCUMENTS

CN   201689509 U   12/2010
JP   3779774 B2   5/2006

OTHER PUBLICATIONS

"Acoustic location", Wikipedia, the free encyclopedia, last modified Mar. 1, 2014, <http://en.wikipedia.org/wiki/Acoustic_location>.

(Continued)

*Primary Examiner* — Thomas Mullen
(74) *Attorney, Agent, or Firm* — Katherine S. Brown; Jeffrey L. Streets (57) ABSTRACT

In an approach to analyzing audible alerts, one or more computer processors receive an audible alert originating external to a user. The one or more computer processors retrieve data related to the audible alert. The one or more computer processors analyze the data related to the audible alert. The one or more computer processors determine, based, at least in part, on the data related to the audible alert, a cause of the audible alert.

17 Claims, 4 Drawing Sheets

(56) References Cited

OTHER PUBLICATIONS

Anonymous, "A mechanism to detect approaching emergency vehicle using sound detection", an IP.com Prior Art Database Technical Disclosure, IP.com No. IPCOM000230635D, IP.com Electronic Publication: Aug. 28, 2013, <http://ip.com/IPCOM/000230635>.

Godavarthi, "Siren Detection Application", CS 410, Sep. 19, 2011, <http://tinyurl.com/lpzznsj>.

"Traffic signal preemption", Wikipedia, the free encyclopedia, last modified Mar. 3, 2014, <http://en.wikipedia.org/wiki/Traffic_signal_preemption>.

* cited by examiner

METHOD, COMPUTER PROGRAM PRODUCT AND SYSTEM FOR ANALYZING AN AUDIBLE ALERT

FIELD OF THE INVENTION

The present invention relates generally to the field of audio signal processing systems and devices, and more particularly to analyzing the cause of audible alerts.

BACKGROUND

A vehicle horn is a sound-making device used to warn others of the approach of the vehicle or of its presence. Automobiles, trucks, ships, and trains are all required by law in some countries to have horns. Bicycles are also legally required to have an audible warning device in many jurisdictions, but not universally, and not always a horn.

Although horns have been standard in vehicles for many years, vehicle telemetry systems are relatively new. In general, vehicle telemetry systems facilitate data or information transfer between a vehicle and a remotely-located user. The user typically receives data from and/or sends data to a vehicle through a personal computer, personal digital assistant (PDA), or other electronic device. Various vehicle telemetry systems can be used to communicate various types of information, such as vehicle security information, vehicle position/location, driver trip information, jurisdiction boundary crossing information, fuel consumption information, driver-messaging, and information relating to remote diagnostics, such as monitoring the wear and tear of the vehicle and its various components, among others.

SUMMARY

Embodiments of the present invention disclose a method, computer program product, and system for analyzing audible alerts. The method includes one or more computer processors receiving an audible alert originating external to a user. The one or more computer processors retrieve data related to the audible alert. The one or more computer processors analyze the data related to the audible alert. The one or more computer processors determine, based, at least in part, on the data related to the audible alert, a cause of the audible alert.

DETAILED DESCRIPTION

Audible alerts are an important means of communication, especially for drivers and pedestrians traveling together in a particular area. Audible alerts, such as car horns and bicycle bells, do not provide any information to the targeted vehicle or person as to why they are being alerted. Often, the intended recipient of an alert may misinterpret the alert or may not even realize that he or she is being alerted.

Embodiments of the present invention recognize that providing a user with feedback regarding patterns of received audible alerts may improve the travel experience for the user and others in the vicinity of the user. Implementation of embodiments of the invention may take a variety of forms, and exemplary implementation details are discussed subsequently with reference to the Figures.

Figure 1:
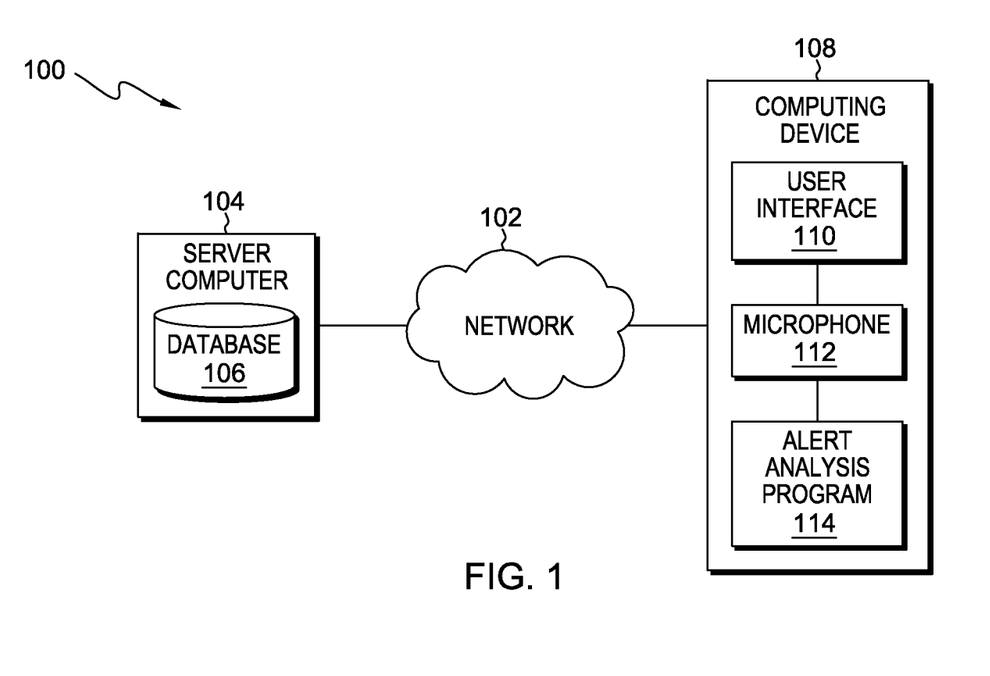
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and computing device 108, interconnected over network 102. Network 102 can be, for example, a telecommunications network, a local area network (LAN), a wide area network (WAN), such as the Internet, or a combination of the two, and can include wired, wireless, or fiber optic connections. In general, network 102 can be any combination of connections and protocols that will support communications between server computer 104 and computing device 108.

Server computer 104 may be a management server, a web server, or any other electronic device or computing system capable of receiving and sending data. In other embodiments, server computer 104 may represent a server computing system utilizing multiple computers as a server system, such as in a cloud computing environment. In another embodiment, server computer 104 may be a laptop computer, a tablet computer, a netbook computer, a personal computer (PC), a desktop computer, a personal digital assistant (PDA), a smart phone, or any programmable electronic device capable of communicating with computing device 108 via network 102. In another embodiment, server computer 104 represents a computing system utilizing clustered computers and components to act as a single pool of seamless resources. Server computer 104 includes database 106.

Database 106 resides on server computer 104. In another embodiment, database 106 may reside on computing device 108, or on another device or component within distributed data processing environment 100 accessible via network 102. A database is an organized collection of data. Database 106 can be implemented with any type of storage device capable of storing data that may be accessed and utilized by server computer 104, such as a database server, a hard disk drive, or a flash memory. In other embodiments, database 106 can represent multiple storage devices within server computer 104. Database 106 stores data related to vehicular and pedestrian travel. Database 106 may include data relating to road traffic. For example, database 106 may include road traffic information such as time of day, day of week, whether or not the day is a holiday, location, weather conditions, road conditions, events known to be taking place nearby that may have a direct impact on traffic and behavior, accidents, police reports, and road construction. Database 106 may also include data related to vehicle telemetry. For example, database 106 may include vehicle telemetry information such as vehicle speed with respect to posted speed limits, brake use, turn signal use, location, position, and fuel consumption. Database 106 may also include relative data between two or more vehicles. For example, database 106 may include information regarding the relative position to other vehicles and rate of change in relative position between vehicles. Database 106 may also include information regarding various alert sounds and associated volume. For example, database 106 may include known automobile horn tones and emergency vehicle sirens, which may be associated with specific automobile makes, models, and with known modifications to automobile horn tones.

Computing device 108 may be a desktop computer, a laptop computer, a tablet computer, a specialized computer server, a smart phone, or any programmable electronic device capable of communicating with server computer 104 via network 102 and with various components and devices within distributed data processing environment 100. Computing device 108 may be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, computing device 108 represents any programmable electronic device or combination of programmable electronic devices capable of executing machine readable program instructions and communicating with other computing devices via a network, such as network 102. Computing device 108 includes user interface 110, microphone 112, and alert analysis program 114. Computing device 108 may include internal and external hardware components, as depicted and described in further detail with respect to FIG. 4.

User interface 110 is a program that provides an interface between a user of computing device 108 and alert analysis program 114. A user interface, such as user interface 110, refers to the information (such as graphic, text, and sound) that a program presents to a user and the control sequences the user employs to control the program. There are many types of user interfaces. In one embodiment, user interface 110 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In one embodiment, user interface 110 is the interface between computing device 108 and alert analysis program 114. In other embodiments, user interface 110 provides an interface between alert analysis program 114 and database 106, which resides on server computer 104.

Microphone 112 receives alert sounds from surrounding vehicles. A microphone is an acoustic-to-electric transducer or sensor that converts sound in air into an electrical signal. Sounds may include horn honking from cars or trucks, sirens from emergency vehicles, bell ringing from a bicycle, and shouting from another driver or pedestrian. In one embodiment, microphone 112 resides in computing device 108. In another embodiment, microphone 112 may reside in a second computing device, such as a navigation system or global positioning system (GPS) device (not shown), provided the second computing device can communicate with computing device 108. In yet another embodiment, microphone 112 may be integrated into a user's vehicle. Microphone 112 may represent one or more microphones.

Alert analysis program 114 analyzes the cause of an audible alert and provides feedback to the user of computing device 108. Alert analysis program 114 receives sound input from microphone 112 when an alert, such as a car horn honking, is detected. Alert analysis program 114 combines the alert sound input from microphone 112 with data from database 106 to provide information to the user regarding the reason the user is being alerted. Alert analysis program 114 analyzes patterns of received alerts over time, and provides the user with valuable feedback. For example, alert analysis program 114 may provide information to a user that helps the user avoid alerts in the future by changing behaviors or patterns. Alert analysis program 114 is depicted and described in further detail with respect to FIG. 2.

Figure 2:
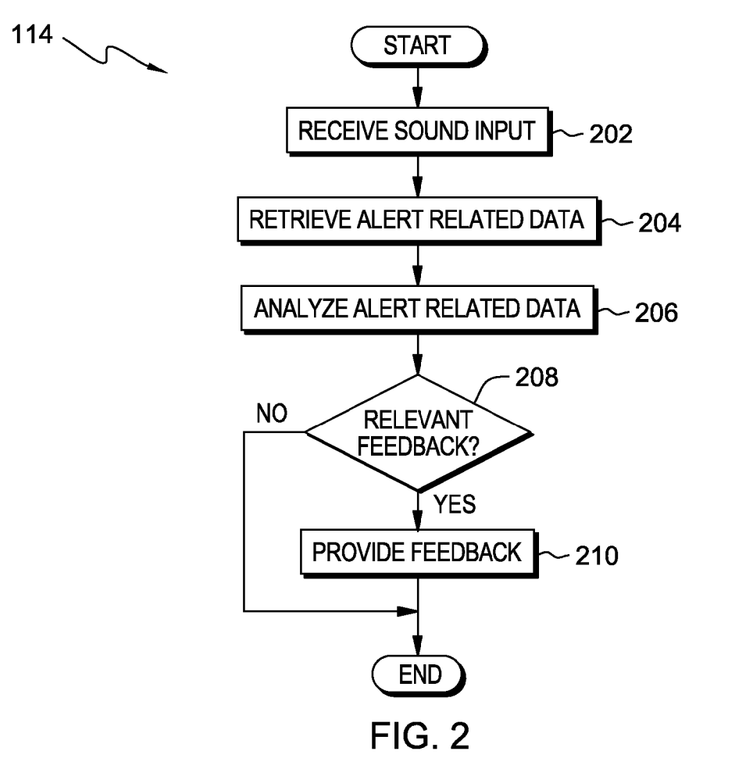
FIG. 2 is a flowchart depicting operational steps of an alert analysis program, on a computing device within the data processing environment of FIG. 1, for analyzing the cause of an audible alert, in accordance with an embodiment of the present invention.

FIG. 2 is a flowchart depicting operational steps of alert analysis program 114, on computing device 108 within data processing environment 100 of FIG. 1, for analyzing the cause of an audible alert, in accordance with an embodiment of the present invention.

Alert analysis program 114 receives sound input from microphone 112 (step 202). Microphone 112 receives alert sounds, converts the sounds to electrical signals, and sends the signals to alert analysis program 114.

Alert analysis program 114 retrieves data related to the received alert (step 204). Responsive to receiving an alert sound input, alert analysis program 114 identifies alert metadata corresponding to the received alert, for example, the date, time and volume of the alert, as well as the location of computing device 108. As described above, database 106 may include data related to traffic, weather, road conditions, and vehicle telemetry. Alert analysis program 114 may also retrieve data from database 106 with respect to other users of computing devices that include alert analysis program 114.

Alert analysis program 114 analyzes the retrieved alert related data (step 206). Alert analysis program 114 compares the retrieved data to the received sound input. Alert analysis program 114 may calculate the distance of the user from the alert using the detected volume and analysis of factory loudness levels. Utilizing the volume of the alert, alert analysis program 114 may also determine the originating direction or location of the alert. Alert analysis program 114 may analyze the distance of the received alert from the user of computing device 108 to determine whether the distance is within a pre-defined threshold, which may indicate that the alert is targeted at the activity of the user of computing device 108. In one embodiment, alert analysis program 114 may analyze relative locations and speeds of other users of alert analysis program 114 within a specified distance from computing device 108 to determine whether an accident or weather conditions have slowed or stopped traffic ahead. In another embodiment, alert analysis program 114 may determine whether an accident or weather conditions have slowed or stopped traffic ahead by receiving input from traffic cameras in the vicinity of computing device 108. In yet another embodiment, alert analysis program 114 may determine whether an accident or weather conditions have slowed or stopped traffic ahead by receiving input from local news reports. Alert analysis program 114 may analyze the user's vehicle telemetry. For example, alert analysis program 114 may determine if a turn signal has been on for a period of time that meets or exceeds a pre-defined threshold.

Alert analysis program 114 determines whether the retrieved data indicates any relevant feedback for the user of computing device 108 (decision block 208). If alert analysis program 114 determines there is no relevant feedback for the user of computing device 108 (no branch, decision block 208), then alert analysis program 114 ends. If alert analysis program 114 determines there is relevant feedback for the user of computing device 108 (yes branch, decision block 208), then alert analysis program 114 provides feedback to the user (step 210). In one embodiment, alert analysis program 114 may provide feedback in real time. For example, the user of computing device 108 may be driving a car when microphone 112 detects an alert, such as a car horn honk. Alert analysis program 114 may determine that another user in close proximity to computing device 108 is not moving, which may indicate that the received alert is to warn the user of computing device 108 that traffic is stopped. Alert analysis program 114 notifies the user of computing device 108 as a warning to drive cautiously. In another embodiment, alert analysis program 114 provides feedback that may be based on data retrieved over a period of time. For example, the user of computing device 108 may be driving a car along a particular route periodically and receiving alerts, such as car horn honks, often while on the particular route. Alert analysis program 114 may determine that the user of computing device 108 is driving below the posted speed limit on this route, causing the cars in the vicinity to honk. Alert analysis program 114 provides feedback to the user of computing device 108 as an indicator that persistent honking is due to slow speed. In one embodiment, alert analysis program 114 notifies the user of computing device 108, via user interface 110, by displaying a message on a screen on computing device 108. For example, alert analysis program 114 may display "WARNING! STOPPED TRAFFIC AHEAD!" In another embodiment, alert analysis program 114 provides feedback, via user interface 110, with an audible message. For example, alert analysis program 114 may use a simulated voice to say "You often drive below the speed limit in this location." In another embodiment, alert analysis program 114 provides feedback, via user interface 110, by causing computing device 108 to vibrate and displaying a message on a screen on computing device 108. For example, if computing device 108 is in the pocket of a hearing-impaired pedestrian, then alert analysis program 114 may cause computing device 108 to vibrate to get the user's attention so the user is aware of a warning displayed on the screen. In this example, the hearing-impaired pedestrian may be crossing a busy street, and alert analysis program 114 warns the pedestrian of oncoming cars. In another embodiment, where alert analysis program 114 is integrated into a vehicle navigation system, alert analysis program 114 may have detected honking related to traffic ahead. In this example, alert analysis program 114 may provide feedback through the navigation system by suggesting an alternate route.

Figure 3:
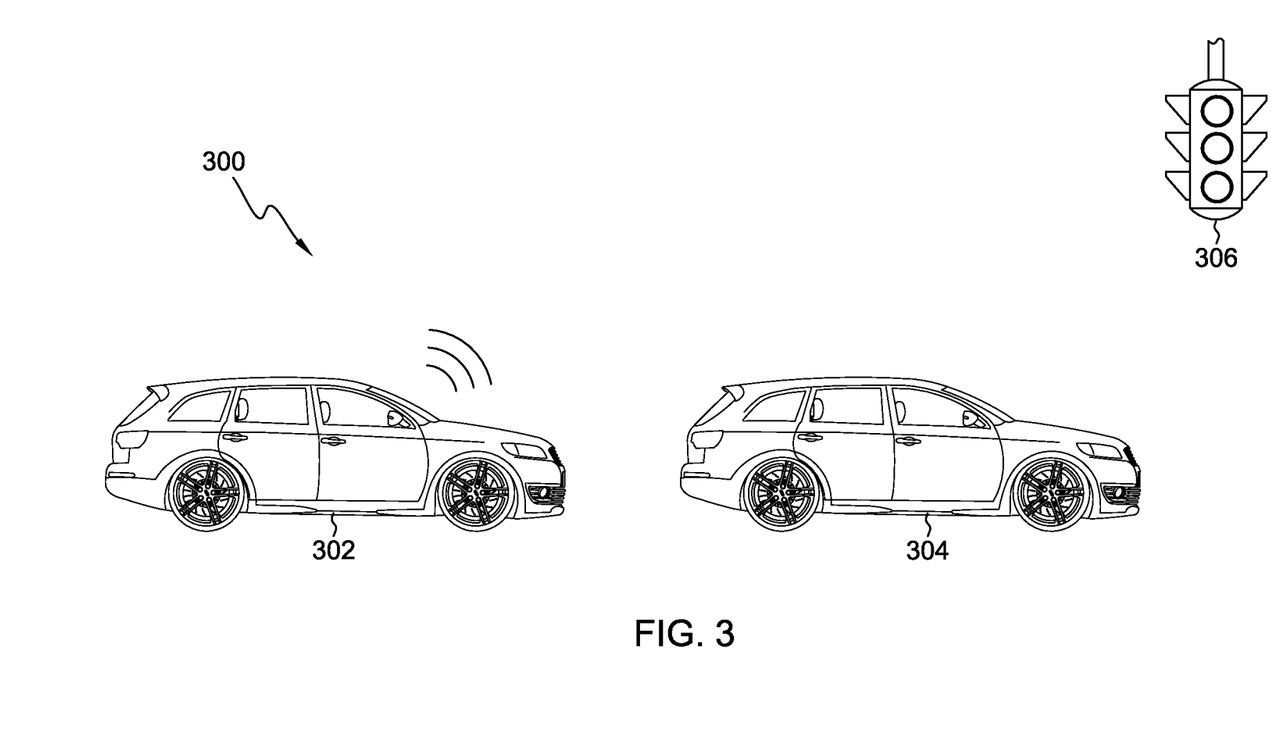
FIG. 3 illustrates an example of an operating environment of the alert analysis program, operating on a computing device within the data processing environment of FIG. 1, in accordance with an embodiment of the present invention.

FIG. 3 illustrates an example of an operating environment of alert analysis program 114, operating on computing device 108 within data processing environment 100 of FIG. 1, in accordance with an embodiment of the present invention.

In diagram 300, computing device 108 is integrated into car 304. Car 304 is stopped at traffic light 306 which is red. Car 302 is behind car 304. The driver of car 304 is talking on a cell phone and not paying attention to traffic light 306. When traffic light 306 turns green, the driver of car 304 does not notice and continues talking on the cell phone. The driver of car 302 honks to get the attention of the driver of car 304. Alert analysis program 114 receives the sound of the honk through microphone 112 (in step 202). In this example, microphone 112 represents several microphones that are mounted on the outside of car 304 (not shown) to enable alert detection. By analyzing the distance and volume of the honk, alert analysis program 114 determines that the honking is coming from car 302 (in step 204). By analyzing the location of vehicles in the vicinity that are equipped with alert analysis program 114, alert analysis program 114 also determines that the cars in front of car 304 are moving away from car 304. Alert analysis program 114 may also note the location of car 304 using the vehicle's GPS navigation system and determine that car 304 is near a traffic light. Alert analysis program 114 analyzes the data related to the received alert (in step 206) and determines that relevant feedback is available for the driver of car 304 (in step 208). Alert analysis program 114 displays a message on a screen in car 304 that is visible to the driver (in step 210). The displayed message may say "Green light!" Upon receipt of the displayed message, the driver of car 304 proceeds forward. In another embodiment, alert analysis program 114 provides feedback by interrupting the phone call with an audible beep sound in the user's cell phone. Upon hearing the beep, the driver of car 304 may look up and notice the green light.

Figure 4:
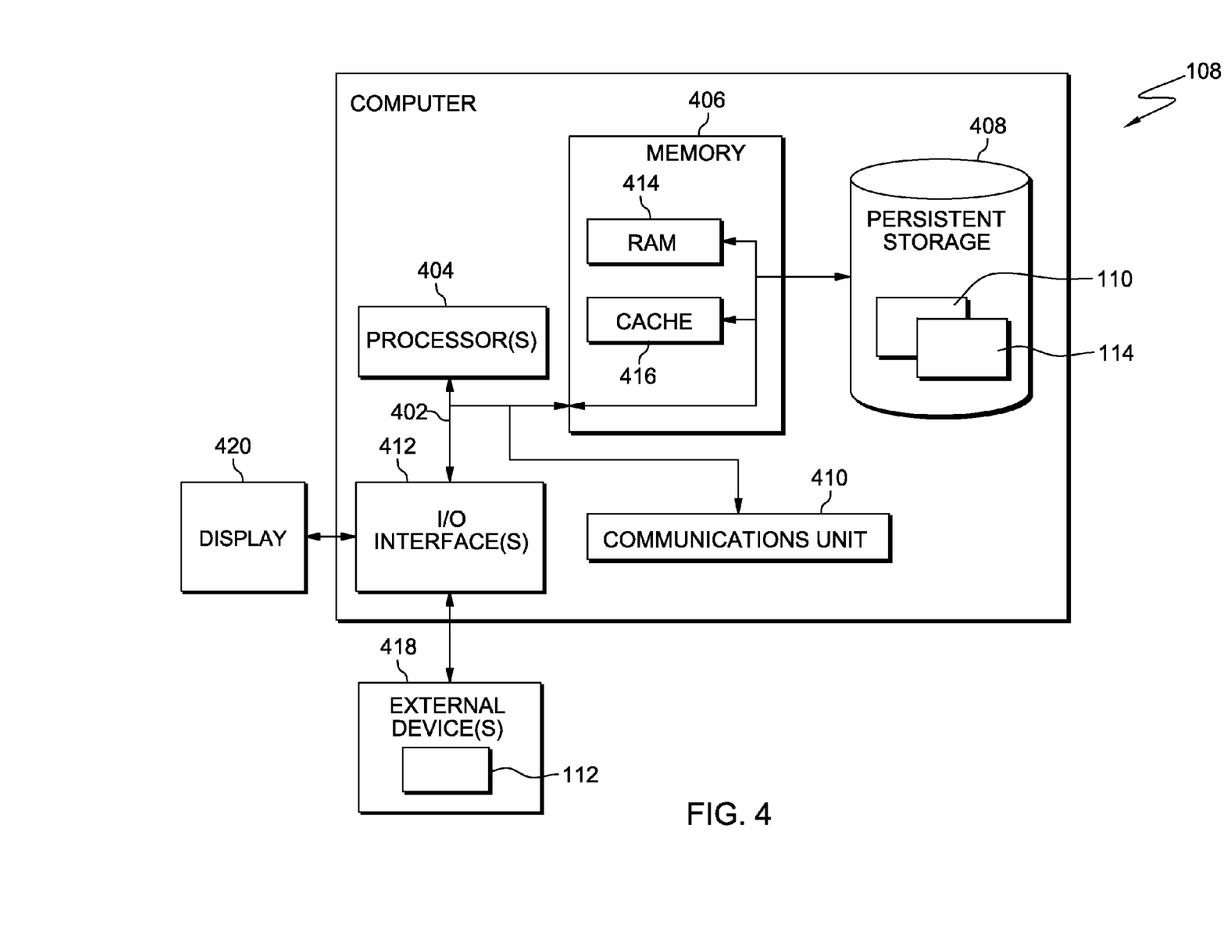
FIG. 4 depicts a block diagram of components of the computing device executing the alert analysis program of FIG. 2, in accordance with an embodiment of the present invention.

FIG. 4 depicts a block diagram of components of computing device 108 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 108 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

User interface 110 and alert analysis program 114 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 104. In these examples, communications unit 410 includes one or more network interface cards. Communications unit 410 may provide communications through the use of either or both physical and wireless communications links. User interface 110 and alert analysis program 114 may be downloaded to persistent storage 408 through communications unit 410.

I/O interface(s) 412 allows for input and output of data with other devices that may be connected to computing device 108. For example, I/O interface(s) 412 may provide a connection to external device(s) 418 such as a keyboard, a keypad, a touch screen, a microphone, e.g. microphone 112, and/or some other suitable input device. External device(s) 418 can also include portable computer readable storage media such as, for example, thumb drives, portable optical or magnetic disks, and memory cards. Software and data used to practice embodiments of the present invention, e.g., user interface 110 and alert analysis program 114, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for analyzing audible alerts, the method comprising:
    receiving, by one or more computer processors, an audible alert originating external to a user;
    retrieving, by the one or more computer processors, data related to the audible alert;
    analyzing, by the one or more computer processors, the data related to the audible alert;
    determining, by the one or more computer processors, based, at least in part, on the data related to the audible alert, a cause of the alert;
    determining, by the one or more computer processors, a time of the audible alert;
    determining, by the one or more computer processors, based, at least in part, on the time of the audible alert and the data related to the audible alert, a user activity at the time of the audible alert; and
    notifying, by the one or more computer processors, the user of the user activity at the time of the audible alert.

2. The method of claim 1, further comprising:
    providing, by the one or more computer processors, the cause of the alert to the user.

3. The method of claim 2, wherein providing, by the one or more computer processors, the cause of the alert to the user includes at least one of displaying information on a display screen, and using a simulated voice to output information.

4. The method of claim 1, further comprising:
    determining, by the one or more computer processors, based, at least in part, on the retrieved data related to the audible alert, at least a time and a location of the audible alert; and
    retrieving, by the one or more computer processors, information identifying a location of the user at the time of the alert.

5. The method of claim 4, further comprising:
    determining, by the one or more computer processors, a user route including the location of the user at the time of the alert; and
    providing, by the one or more computer processors, the user with an alternate route based, at least in part, on the location of the user at the time of the alert.

6. The method of claim 1, wherein analyzing, by the one or more computer processors, the data related to the audible alert further comprises:
    comparing, by the one or more computer processors, the related data to at least one predefined threshold associated with the received audible alert; and
    determining, by the one or more computer processors, whether the related data meets at least one of the pre-defined thresholds for indicating a cause of the audible alert.

7. The method of claim 1, wherein determining, by the one or more computer processors, based, at least in part, on the data related to the audible alert, a cause of the alert further comprises:
    retrieving, by the one or more computer processors, data related to two or more audible alerts;
    determining, by the one or more computer processors, based, at least in part, on the data related to the two or more audible alerts, a pattern of received audible alerts; and
    determining, by the one or more computer processors, based, at least in part, on the pattern of received audible alerts, a cause of the two or more audible alerts.

8. The method of claim 7, further comprising:
    providing, by the one or more computer processors, the cause of the two or more audible alerts to the user.

9. A computer program product for analyzing audible alerts, the computer program product comprising:
    one or more computer readable storage media and program instructions stored on the one or more computer readable storage media, the program instructions comprising:
    program instructions to receive an audible alert originating external to a user;
    program instructions to retrieve data related to the audible alert;
    program instructions to analyze the data related to the audible alert;
    program instructions to determine, based, at least in part, on the data related to the audible alert, a cause of the alert;
    program instructions to determine a time of the audible alert;
    program instructions to determine, based, at least in part, on the time of the audible alert and the data related to the audible alert, a user activity at the time of the audible alert; and
    program instructions to notify the user of the user activity at the time of the audible alert.

10. The computer program product of claim 9, further comprising:
    program instructions to provide the cause of the alert to the user.

11. The computer program product of claim 9, wherein program instructions to analyze the data related to the audible alert further comprises:
    program instructions to compare the related data to at least one predefined threshold associated with the received audible alert; and
    program instructions to determine whether the related data meets at least one of the pre-defined thresholds for indicating a cause of the audible alert.

12. The computer program product of claim 9, wherein program instructions to determine, based, at least in part, on the data related to the audible alert, a cause of the alert further comprises:
    program instructions to retrieve data related to two or more audible alerts;
    program instructions to determine, based, at least in part, on the data related to the two or more audible alerts, a pattern of received audible alerts; and program instructions to determine, based, at least in part, on the pattern of received audible alerts, a cause of the two or more audible alerts.

13. The computer program product of claim 12, further comprising:
program instructions to provide the cause of the two or more audible alerts to the user.

14. A computer system for analyzing audible alerts, the computer system comprising:
one or more computer processors;
one or more computer readable storage media;
program instructions stored on the computer readable storage media for execution by at least one of the one or more processors, the program instructions comprising:
program instructions to receive an audible alert originating external to a user;
program instructions to retrieve data related to the audible alert;
program instructions to analyze the data related to the audible alert;
program instructions to determine, based, at least in part, on the data related to the audible alert, a cause of the alert;
program instructions to determine a time of the audible alert;
program instructions to determine, based, at least in part, on the time of the audible alert and the data related to the audible alert, a user activity at the time of the audible alert; and
program instructions to notify the user of the user activity at the time of the audible alert.

15. The computer system of claim 14, further comprising:
program instructions to provide the cause of the alert to the user.

16. The computer system of claim 14, wherein program instructions to determine, based, at least in part, on the data related to the audible alert, a cause of the alert further comprises:
program instructions to retrieve data related to two or more audible alerts;
program instructions to determine, based, at least in part, on the data related to the two or more audible alerts, a pattern of received audible alerts; and
program instructions to determine, based, at least in part, on the pattern of received audible alerts, a cause of the two or more audible alerts.

17. The computer system of claim 16, further comprising:
program instructions to provide the cause of the two or more audible alerts to the user.

* * * * *